United States Patent
Wang et al.

(10) Patent No.: US 7,818,485 B2
(45) Date of Patent: Oct. 19, 2010

(54) IO PROCESSOR

(75) Inventors: Hsun-Wen Wang, Taipei County (TW); Teh-Chern Chou, Taipei Hsien (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 180 days.

(21) Appl. No.: 12/338,952

(22) Filed: Dec. 18, 2008

(65) Prior Publication Data

US 2009/0164691 A1    Jun. 25, 2009

Related U.S. Application Data

(60) Provisional application No. 61/015,203, filed on Dec. 20, 2007.

(51) Int. Cl.
*G06F 13/20* (2006.01)
*G06F 13/36* (2006.01)

(52) U.S. Cl. ............. 710/309; 710/311; 710/313; 710/315

(58) Field of Classification Search .......... 710/309
See application file for complete search history.

(56) References Cited

U.S. PATENT DOCUMENTS

| | | | |
|---|---|---|---|
| 6,347,294 B1 * | 2/2002 | Booker et al. ............. | 703/28 |
| 6,654,835 B1 * | 11/2003 | Foster et al. ............. | 710/110 |
| 7,281,072 B2 * | 10/2007 | Liu et al. ............. | 710/240 |
| 2006/0136688 A1 * | 6/2006 | Pang et al. ............. | 711/162 |
| 2006/0155883 A1 * | 7/2006 | Chou et al. ............. | 710/3 |
| 2006/0206494 A1 * | 9/2006 | Ibrahim et al. ............. | 707/10 |
| 2006/0259650 A1 * | 11/2006 | Chou et al. ............. | 710/8 |
| 2006/0282639 A1 * | 12/2006 | Liu et al. ............. | 711/170 |
| 2007/0165660 A1 * | 7/2007 | Fang et al. ............. | 370/410 |
| 2008/0282264 A1 * | 11/2008 | Chen et al. ............. | 719/320 |

FOREIGN PATENT DOCUMENTS

| | | | |
|---|---|---|---|
| EP | 1674980 A2 * | 6/2006 | |
| EP | 1681625 A2 * | 7/2006 | |
| JP | P2002110925 A | 4/2002 | |

* cited by examiner

*Primary Examiner*—Ryan M Stiglic
(74) *Attorney, Agent, or Firm*—Winston Hsu; Scott Margo; Min-Lee Teng

(57) ABSTRACT

An IO processor includes an embedded central processing unit (CPU), a switch connected to the embedded CPU, an external CPU bus controller connected to the switch for optionally connecting to an external CPU, a first memory controller connected to the switch for connecting to a first memory, and a second memory controller connected to the switch for optionally connecting to a second memory. The IO processor may be connected to the external CPU, to the second memory, or be capable of connecting to external CPUs of different ranks, depending on the situation, so as to meet the cost considerations and the actual application requirements.

42 Claims, 5 Drawing Sheets

IO PROCESSOR

CROSS REFERENCE TO RELATED APPLICATIONS

This application claims the benefit of U.S. Provisional Application No. 61/015,203, which was filed on Dec. 20, 2007.

BACKGROUND OF THE INVENTION

1. Field of the Invention

The present invention provides an IO processor, especially an IO processor which includes an embedded CPU and can be optionally connected with an external CPU.

2. Description of the Prior Art

In the conventional storage virtualization systems, there existed various problems as follows. In one conventional storage virtualization system, because a great quantity of IO procedures is processed only with software, a CPU wastes a lot of time on processing IO procedures, resulting in low performance of the entire system. In another conventional storage virtualization system, although hardware is provided in a storage virtualization controller (SVC) to assist IO procedure processing, because no dedicated IO processor is provided, the circuitry in the SVC is complicated and costly. In still another conventional storage virtualization system, although a dedicated IO processor including an embedded CPU is provided in an SVC, such an IO processor lacks CPU scalability. Thanks to the prosperous development of the network environment, many requests coming from various host computers need to be processed by the SVC at the same time, and thus a huge amount of IO instructions for data movement, computation, interruption, etc., are generated to be handled; however, only one embedded CPU can not handle the heavy loading from all the associated procedures, which results in the performance degradation of the entire system. Therefore, the IO processor performance becomes a bottleneck of the system performance.

Moreover, if the IO processor in the conventional SVC is provided with an external CPU with a dual core structure for processing the IO procedures, although the processing speed is fast, the cost is high, and once one of the dual CPU cores breaks down, the external CPU with the dual core structure needs to be replaced totally, rather than replacing just the broken CPU core. Furthermore, when a load for CPU is too heavy or too light, the external CPU with the dual core structure lacks the flexibility to change only one of the CPU cores instead of switching both CPU cores together to meet the cost considerations and requirements of practical applications.

SUMMARY OF THE INVENTION

The present invention provides an IO processor capable of coupling to an external CPU optionally, in which the rank of the external CPU can be adjusted, according to the cost concern and the requirements in application.

The present invention provides an IO processor utilized in a storage virtualization system, comprising: an embedded CPU; a switch coupled to the embedded CPU; an external CPU bus controller coupled to the switch for optionally coupling to an external CPU; a first memory controller coupled to the switch for coupling to a first memory; and a second memory controller coupled to the switch for optionally coupling to a second memory.

The present invention also provides a storage virtualization controller comprising: an IO processor; at least one first memory; at least one IO device interconnect controller for coupling to the IO processor; a host-side port provided in the at least one IO device interconnect controller for coupling to a host; a device-side port provided in the at least one IO device interconnect controller for coupling to at least one physical storage device (PSD); and the IO processor comprising: an embedded CPU; a switch coupled to the embedded CPU; an external CPU bus controller coupled to the switch for optionally coupling to an external CPU; a first memory controller coupled to the switch for coupling to a first memory; and a second memory controller coupled to the switch for optionally coupling to a second memory.

The present invention also provides a storage virtualization subsystem comprising: a disk array comprising a plurality of physical storage devices for providing storage space; and a storage virtualization controller coupled to the disk array for receiving IO requests accessing the disk array from a host, the storage virtualization controller comprising: an IO processor; at least one first memory; at least one IO device interconnect controller coupled to the IO device processor; a host-side port provided in the at least one IO device interconnect controller for connecting to the host; a device-side port provided in the at least one IO device interconnect controller for connecting to the disk array; and the IO processor comprising: an embedded CPU; a switch coupled to the embedded CPU; an external CPU bus controller coupled to the switch for optionally coupling to an external CPU; a first memory controller coupled to the switch for coupling to a first memory; and a second memory controller coupled to the switch for optionally coupling to a second memory.

The present invention also provides a method of performing data processing used in an IO processor having a switch, an embedded CPU, an external CPU bus, an IO processing device other than the CPU, a first memory controller, and a second memory controller, the method comprising: providing a first memory coupled to a first memory controller, the first memory being mainly for storing IO data other than CPU data and CPU instructions; providing a second memory coupled to a second memory controller, the second memory being mainly for storing CPU data and CPU instructions; providing a CPU instruction in the second memory; the embedded CPU accessing CPU data and CPU instructions stored in the second memory through the switch and the second memory controller; the IO processing device other than the CPU processing a first IO data; and buffering the first IO data in the first memory through the switch.

According to the claimed invention, the switch comprises: a first arbiter; a second arbiter; and a first bridge coupled between the first arbiter and the second arbiter, wherein the embedded CPU, the external CPU bus controller, and the second memory controller are coupled to the second arbiter, and the first memory controller is coupled to the first arbiter.

According to the claimed invention, the first arbiter is operated based on a first bus protocol, and the second arbiter is operated based on a second bus protocol.

According to the claimed invention, the IO processor further comprises an address remapping device coupled between the first arbiter and the second arbiter, and coupled to the first bridge.

According to the claimed invention, the IO processor further comprises a RAID 6 engine for generating parity data.

According to the claimed invention, the IO processor further comprises a DIF engine for generating or verifying data correctness with DIF data.

According to the claimed invention, the IO processor further comprises an IO interface controller for coupling to an IO interconnect controller.

According to the claimed invention, the IO processor further comprises a USB controller for processing USB signals transmitted to the IO processor.

According to the claimed invention, the IO processor further comprises a TCP engine for moving data in a memory.

According to the claimed invention, the IO processor is coupled to an external CPU, one of the external CPU and the embedded CPU is used as a primary CPU for a storage virtualization controller in the storage virtualization system, the other of the external CPU and the embedded CPU is used as a slave CPU for the storage virtualization controller, and the primary CPU assigns requests issued from a host entity to the slave CPU for execution.

According to the claimed invention, the IO processor further comprise: providing an external CPU coupled to the external CPU bus to share workload of the embedded CPU.

According to the claimed invention, the second memory controller is coupled to the second memory, and the second memory is used dedicatedly for storing data and instructions of the embedded CPU or of the external CPU.

According to the claimed invention, the second memory controller is coupled to the second memory, and IO data that are not CPU data or CPU instructions are stored in the first memory.

These and other objectives of the present invention will no doubt become obvious to those of ordinary skill in the art after reading the following detailed description of the preferred embodiment that is illustrated in the various figures and drawings.

DETAILED DESCRIPTION

Storage Virtualization Technology

"Storage virtualization" is the technology of virtualizing physical storage space, which combines different sections of physical storage devices (PSDs) into a logical storage entity, called "logical media units" (LMUs) here, for access by a host. This technology is primarily utilized in a Redundant Array of Independent Disks (RAID), and through the RAID technology, the smaller physical storage devices can be combined into an LMU of larger capacity, fault tolerance, and higher performance.

Figure 1:
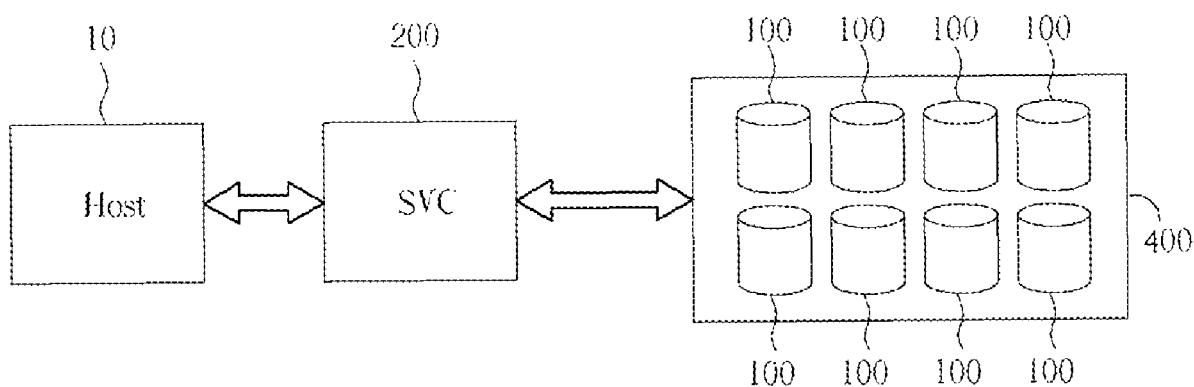
FIG. 1 is a block diagram of circuitry units of a storage virtualization system according to an embodiment of the present invention.

FIG. 1 is a block diagram of circuitry units of a storage virtualization system according to an embodiment of the present invention. The storage virtualization system includes a host 10, an SVC 200, and a PSD array 400. Although in FIG. 1 there is only one SVC 200 connected to one host 10, in practical applications, there may be a plurality of SVCs 200 connected to one host 10, or one SVC 200 connected to a plurality of hosts 10, or a plurality of SVCs 200 connected to a plurality of hosts 10.

The host 10 may be a host computer, such as a server, a workstation, or a PC. The SVC 200 may be a RAID controller or a JBOD (Oust a Bunch of Drives) emulator. The PSD array 400 includes 8 PSDs 100 as the data storage space of the storage virtualization computer system. The PSD may be a Hard Disk Drive (HDD), an Optical Disk Drive, or a Digital Versatile Disk drive (DVD drive), etc. The data in the storage virtualization computer system may be categorized into user data and check data. The user data are for the host 10, and the check data may be mirrored data or parity data. The mirrored data are an identical backup data to the user data, and the parity data are data obtained from the user data by processing them with an algorithm. When part of the user data is lost, the original user data may be regenerated by the parity data and the rest of the user data. Although the PSD array 400 in FIG. 1 only includes 8 PSDs 100, in fact, the amount of the PSDs 100 included in the PSD array 400 is not meant to be limited to this number.

Figure 2:
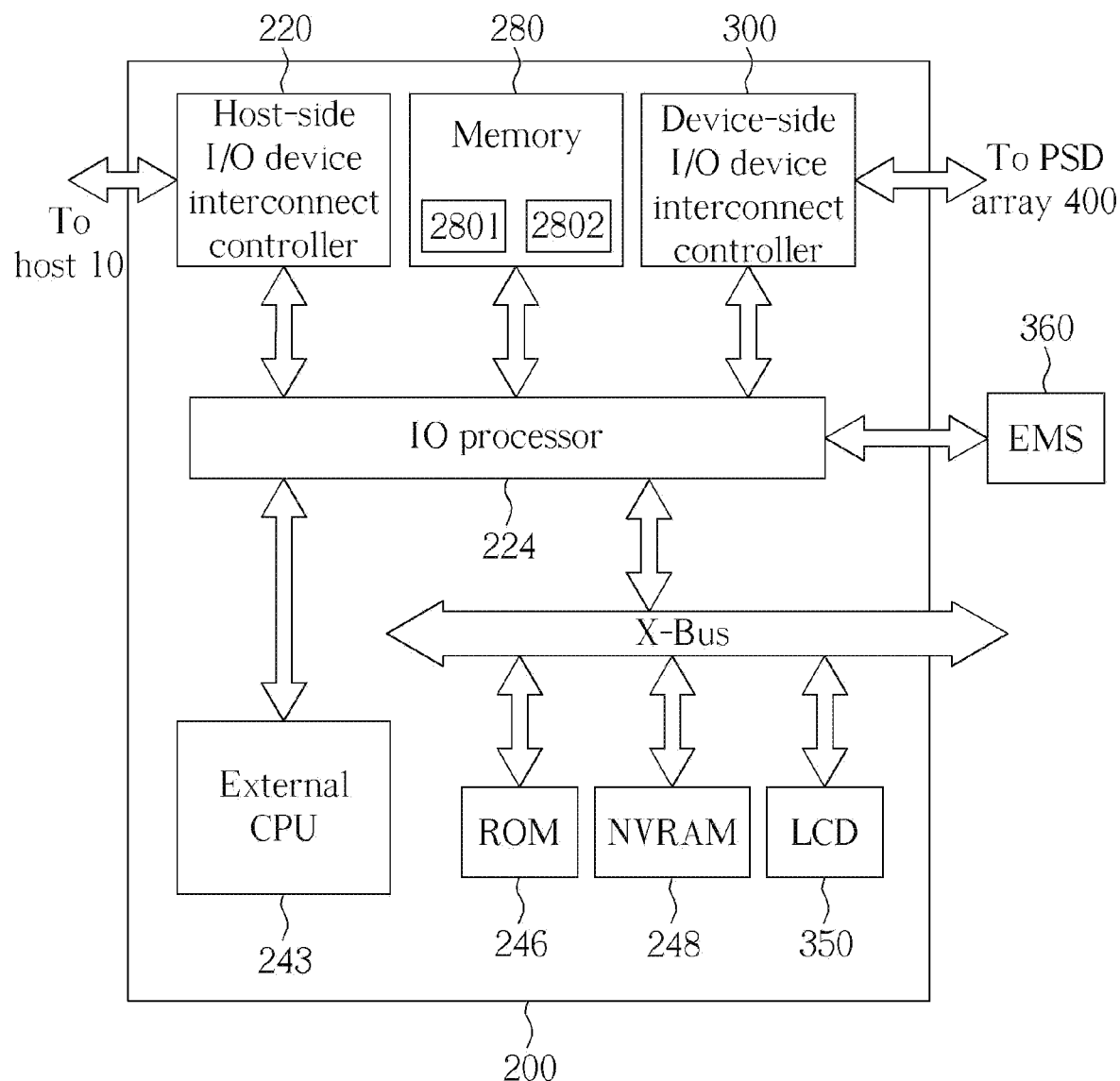
FIG. 2 is a block diagram of a storage virtualization controller (SVC) according to an embodiment of the present invention.

FIG. 2 is a block diagram of an SVC 200 according to an embodiment of the present invention. The main purpose of the SVC 200 is to map the combination of sections of physical storage media to logical media units (LMUs) visible to the host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

The storage virtualization subsystem comprises the SVC 200 and the PSD array 400. When the RAID level of the LMUs of the storage virtualization subsystem is not RAID 0 or RAID 1, for example, RAID 3 to RAID 5, the PSD array 400 will include at least one parity PSD 100, meaning that there are parity data stored in the PSD 100. Therefore, the data availability of entire system is enhanced. In addition, because the processed data are distributed to more than one PSD 100, the performance of executing the IO operations is also improved. Moreover, because the LMU is combined from a plurality of PSDs 100, readable storage capacity in a single one LMU is also increased dramatically. For example, the RAID subsystem of RAID 5 may achieve all of the above-mentioned functions.

When the RAID level of the LMUs of the storage virtualization subsystem is set to RAID 1, the same data will be stored into 2 PSDs 100 simultaneously. Thus, the cost of the PSDs 100 doubles, but data availability or data access efficiency will be increased dramatically.

In addition, when performance improvement prevails over the availability concerns, a logical media unit in the SVS is set to use a RAID level 0 and thus no enhancement of data availability is provided. Performance, however, can be greatly improved. For example, a RAID subsystem of RAID level 0 having 2 hard disk drives can have, theoretically, a performance of 200% of a storage device having only one hard disk drive, since different data sections can be stored into the two separate hard disk drives at the same time under the control of the SVC 200.

The SVC 200 includes a host-side I/O device interconnect controller 220, a memory 280, a device-side I/O device interconnect controller 300, an IO processor 224, an external CPU 243, a ROM (Read Only Memory) 246, a NVRAM (Non-volatile Random Access Memory) 248, and an LCD 350. The host-side I/O device interconnect controller 220 is used as a buffer interface between the host 10 and the IO processor 224 for transmitting IO requests from the host 10 to the IO processor 224 through host-side I/O device interconnect controller 220 for processing, or replying the processed result of the IO processor 224 to the host 10 through host-side I/O device interconnect controller 220. The device-side I/O device interconnect controller 300 is used as a buffer interface between the IO processor 224 and the PSD array 400 for transmitting IO requests from the IO processor 224 to the PSD array 400 through device-side I/O device interconnect controller 300, or transmitting the stored data in the PSD array 400 to the memory 280 through device-side I/O device interconnect controller 300. Both the host-side I/O device interconnect controller 220 and the device-side I/O device interconnect controller 300 contain a plurality of host-side ports and device-side ports, respectively, for connecting with the host-side IO devices and the device-side IO devices. According to an embodiment of the present invention, the host-side I/O device interconnect controller 220 and the device-side I/O device interconnect controller 300 may be combined into a single I/O device interconnect controller with a plurality of ports for connecting to the host-side IO devices and the device-side IO devices separately. The host-side I/O device interconnect controller 220, the memory 280, and the device-side I/O device interconnect controller 300 are all coupled to the IO processor 224 through buses. And because the IO processor 224 already contains an embedded CPU 242 (please refer to FIG. 3), the external CPU 243 may be optionally provided. The memory 280 may further contain a first memory 2801 and a second memory 2802 for storing temporary data and/or data and instructions of the CPUs, wherein the second memory 2802 may be optionally provided.

In FIG. 2 the external memory 243 may be, for example, a Power PC CPU, and the ROM 246 may be a flash memory for storing a basic input/output system (BIOS) or other programs. The NVRAM 248 may store data related to executing status of the IO operation of the PSD array 400. The data stored in the NVRAM 248 may be used as detection data when an abnormal power shutdown occurs before an on-going IO operation is completed. The LCD 350 may display the operation status of the subsystem. An enclosure management service (EMS) 360 may control power of the PSD array 400 and perform other management tasks. The ROM 246, the NVRAM 248, and the LCD 350 may all be coupled to the IO processor 224 through an X-bus.

Figure 3:
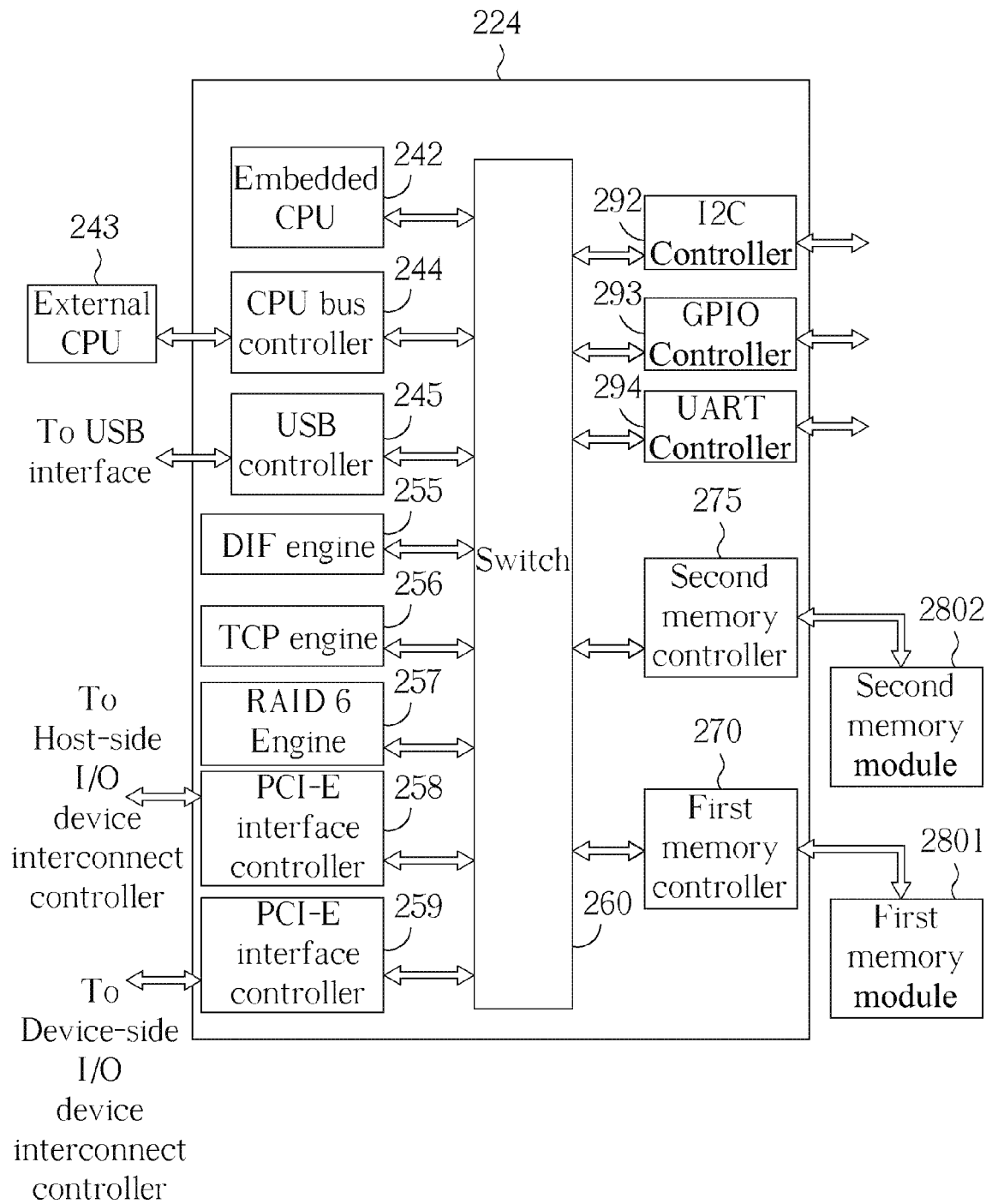
FIG. 3 is a block diagram of an IO processor according to an embodiment of the present invention.

FIG. 3 is a block diagram of the IO processor 224 according to an embodiment of the present invention. The IO processor 224 may include an embedded CPU 242, an external CPU bus controller 244, a USB controller 245, a DIF engine 255, a TCP engine 256, a RAID 6 engine 257, 2 PCI-Express interface controllers 258 and 259, a first memory controller 270, a second memory controller 275, an I2C controller 292, a GPIO controller 293, a UART controller 294, and a switch 260 which is coupled to all of the aforementioned devices inside the IO processor 224 and acts as a bidirectional transmission interface between the devices coupled to it. The IO processor 224 may be optionally coupled to the external CPU 243 through the external bus controller 244. The first memory controller 270 may be coupled to the first memory 2801, and the second memory controller 275 may be coupled to the second memory 2802.

According to an embodiment of the present invention, the switch 260 may contain an arbiter (not shown), and moreover, the embedded CPU 242, the external CPU bus controller 244, the USB controller 245, the DIF engine 255, the TCP engine 256, the RAID 6 engine 257, the 2 PCI-Express interface controllers 258 and 259, the first memory controller 270, the second memory controller 275, the I2C controller 292, the GPIO controller 293, and the UART controller 294 may all be coupled to the arbiter.

According to an embodiment of the present invention, the external CPU 243 need not be provided and coupled to the external CPU bus controller 224, and the second memory 2802 need not be provided and coupled to the second memory controller 275, but only the first memory 2801 be provided and coupled to the first memory controller 270.

According to another embodiment of the present invention, both the first memory 2801 and the second memory 2802 may be provided and coupled to the first memory controller 270 and the second memory controller 275, respectively, but the external CPU 243 need not to be provided and coupled to the external CPU bus controller 224.

According to still another embodiment of the present invention, both the external CPU 243 and the first memory 2801 may be provided and coupled to the external CPU bus controller 224 and the first memory controller 270, respectively, but the second memory 2802 need not be provided and coupled to the second memory controller 275.

According to a further embodiment of the present invention, the external CPU 243 may be provided and coupled to the external CPU bus controller 224, the first memory 2801 may be provided and coupled to the first memory controller 270, and simultaneously the second memory 2802 may be provided and coupled to the second memory controller 275. According to an embodiment of the present invention, the second memory 2802 may be used dedicatedly for storing the data and instructions of the embedded CPU 242 and/or the external CPU 243.

Among the above-mentioned embodiments, in the SVC 200, when the external CPU 243 is not provided, only the embedded CPU 242 may be used for processing the IO requests and operations. On the other hand, when the external CPU 243 is provided and coupled to the IO processor 224, both the embedded CPU 242 and the external CPU 243 in the SVC 200 may be used for processing the IO requests and operations together.

In the above-mentioned embodiments, when only the first memory 2801 is provided and the second memory 2802 is omitted, the first memory 2801 alone may be used as a general memory for storing the data and instructions of the CPUs and the data of other circuitry units.

If both the first memory 2801 and the second memory 2802 are provided, according to an embodiment of the present invention, the second memory 2802 may be used as a dedicated memory for dedicatedly storing the data and instructions of the CPUs, while the first memory 2801 may be used as a general memory for storing the data and instructions of the CPUs and the other circuitry units. According to another embodiment of the present invention, the second memory 2802 may also be used for dedicatedly storing the data and instructions of the CPU(s) coupled to the IO processor 224. For example, the CPU(s) connected to the IO processor 224 may be either the embedded CPU or the external CPU, or both. According to still another embodiment of the present invention, the IO data that are not data or instructions of the CPUs may be stored in the first memory 2801. According to one more embodiment of the present invention, the first memory 2801 and the second memory 2802 may both be used as general memory modules.

Figure 4:
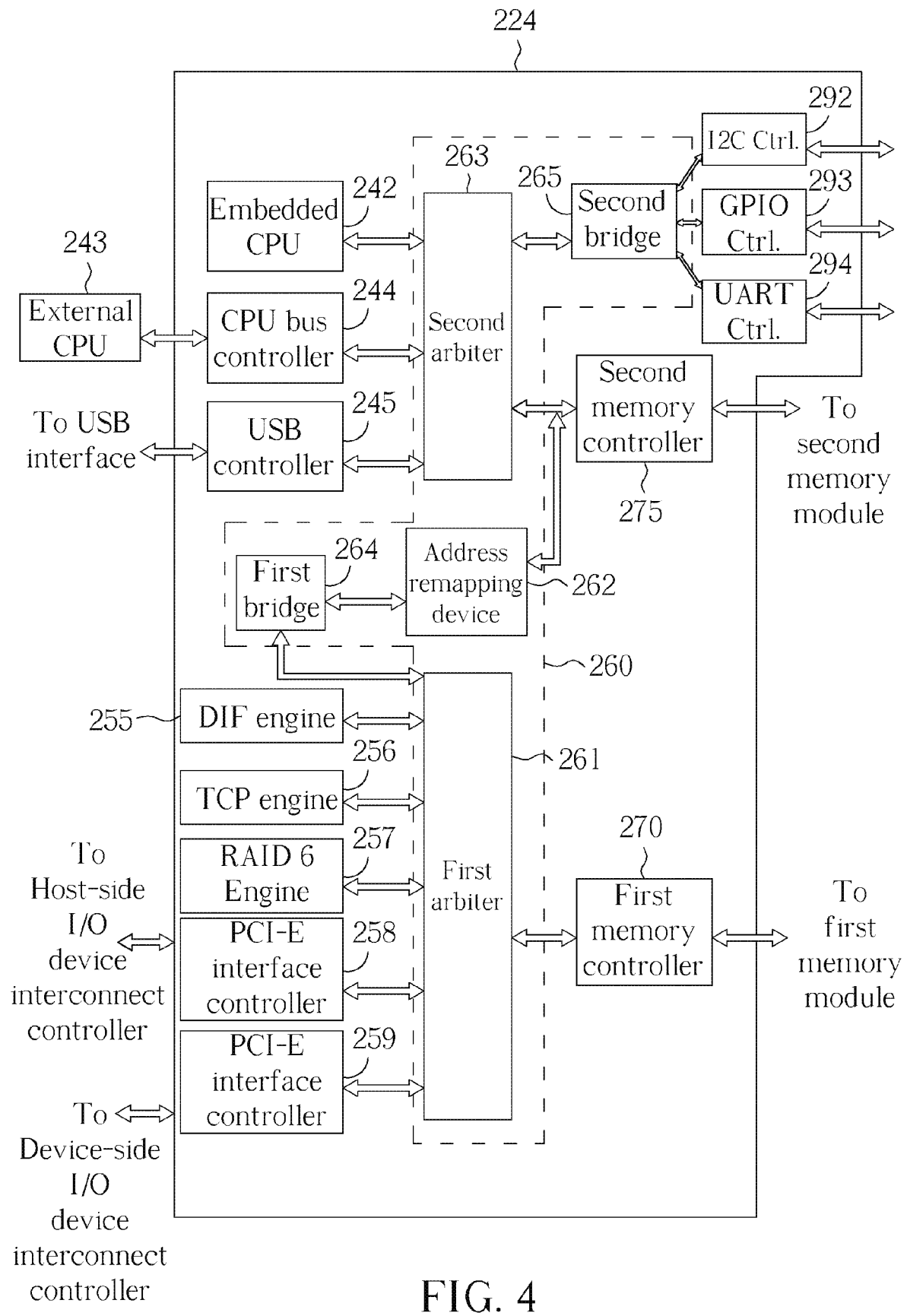
FIG. 4 is a block diagram of an IO processor and the connection configuration with other circuitry units according to another embodiment of the present invention.

FIG. 4 is a block diagram of the IO processor 224 according to a further embodiment of the present invention. The IO processor 224 includes a DIF engine 255, a TCP engine 256, a RAID 6 engine 257, 2 PCI-Express interface controllers 258 and 259, a first memory controller 270, and a first arbiter 261. The first arbiter 261 is connected to all of the aforementioned devices inside the IO processor 224 as a bidirectional transmission interface between the devices connected to it. The IO processor 224 further includes the embedded CPU 242, the external CPU bus controller 244, the USB controller 245, and the second memory controller 275, which may all be connected to a second arbiter 263. The IO processor 224 may further include an I2C controller 292, a GPIO controller 293, and a UART controller 294, which may all be connected to the second arbiter 263 through a second bridge 265. The second arbiter 263 may be used as a bidirectional transmission interface between the devices connected to it. The second arbiter 263 is connected to the first arbiter 261 through an address remapping device 262 and a first bridge 264, and therefore, the devices connected to the first arbiter 261 and the second arbiter 263, respectively, may communicate with each other through the address remapping device 262 and the first bridge 264. The IO processor 224 is optionally connected to the external CPU 243 through the external CPU bus controller 244, the first memory 2801 is connected to the first memory controller 270, and the second memory 2802 is optionally connected to the second memory controller 275. The devices in FIG. 4 are described as follows.

Please refer to FIG. 3 and FIG. 4. According to an embodiment of the present invention, the embedded CPU 242 may be, for example, a CPU of the Power PC CPU PPC 440 series, which utilizes a super scalar structure and has 36 address lines, 128 data transmission lines, and 128 data receiving lines. The frequency of the front side bus of the PPC 440 series may be 166 MHz, and the working frequency of the CPU may be 677 MHz. According to an embodiment of the present invention, when the external CPU 243 is connected and used, the external CPU 243 may be used as a primary CPU, and the embedded CPU 242 may be used as a slave CPU for assisting the external CPU 243 to process part of the workload thereof. The external CPU 243 assigns, through software and firmware settings, part of the workload to the embedded CPU 242 to execute. After finishing the jobs assigned by the external CPU 243, the embedded CPU 242 may notify the external CPU 243 of the final processing result and the related information thereof. The embedded CPU 242 may process part of data access to memory or the I/O operations of other peripheral interfaces according to the software setting, to keep the external CPU 243 free from processing the IO operations and the requests from the host IO alone, so that the external CPU 243 may have more time to process other jobs and/or requests from the host IO, and workload thereof may be shared, and the performance of the entire system may be improved. According to another embodiment of the present invention, the embedded CPU 242 may be the primary CPU, and the external CPU 243 may be the slave CPU. According to still another embodiment of the present invention, the embedded CPU 242 and the external CPU 243 may share the workload together through parallel processing.

In a case where the external CPU 243 is omitted, the embedded CPU 242 will be the primary CPU and have to process all of the requests from the host 10. Usually, a normal CPU has 32 address lines and is capable of addressing a memory space of 4 GB. However, according to another embodiment of the present invention, the embedded CPU 242 may have 36 address lines and be capable of addressing a memory space of 64 GB, and this addressing capability can be used flexibly, depending on the needs of the software. According to another embodiment of the present invention, the IO processor 224 may contain a plurality of the embedded CPUs 242. Please note that the example of the embedded CPU 242 being the CPU of the Power PC CPU PPC 440 series is for illustrative purposes only, and is not meant to be a limitation of the present invention.

According to another embodiment of the present invention, the external CPU bus controller 244 may be, for example, a 60X bus interface controller. Please note that the example of the external CPU bus controller 244 being the 60X bus interface controller is for illustrative purposes only, and is not meant to be a limitation of the present invention. The external CPU bus controller 244 may be used as the transmission interface between the external CPU 243 and the second arbiter 263 to facilitate communication between these two devices working on different protocols. According to another embodiment of the present invention, the external CPU bus controller 244 may connect to a plurality of the external CPUs 243. According to another embodiment of the present invention, the IO processor 224 may include a plurality of the external CPU bus controllers 244 to connect to a plurality of the external CPUs 243.

According to an embodiment of the present invention, the external CPU 243 may be, for example, a CPU of the Power PC PPC 750 series. Please note that the example of the external CPU 243 being the CPU of the Power PC CPU PPC 750 series is for illustrative purposes only, and is not meant to be a limitation of the present invention. The PPC 750 is an external CPU capable of communicating with other circuitry units in the IO processor 224 through the 60X bus interface controller 244 of the IO processor 224, and may be designed with the super scalar structure and with 32 address lines and 64 data lines. The frequency of the front side bus of the PPC 750 series may be 200 MHz, and the maximum working frequency of the CPU may be 1 GHz. Generally speaking, the external CPU 243 may be used as the primary CPU for processing the heavy operations in the SVC 200, and the external CPU 243 may be flexibly upgraded its rank to improve system performance depending on the workload of the system. According to another embodiment of the present invention, there may be a plurality of the external CPUs 243.

According to an embodiment of the present invention, the USB controller 245 may be applied in a peripheral system of a computer for performing the functions of the host controller defined in the specifications of USB 2.0, and of enhanced host controller interface (EHCI), and of open host controller interface (OHCI). The host controller may support USB transmission functions of high speed at 480 Mbps, and/or of full speed at 12 Mbps, and/or of low speed at 1.5 Mbps. The USB controller 245 may be connected to a USB external port (not shown) for externally connecting to a flash memory with a USB interface, an HDD with a USB interface, an Optical Disk Drive with a USB interface, or other non-volatile storage devices with a USB interface, These storage devices can be used as a NVRAM into which data in the main memory may be stored when the main power shuts down. In addition, the USB external port may connect to a USB-to-LAN interface for performing debugging function of the IO processor 224, or the USB external port may connect to a PC for examining statuses of the IO processor 224.

According to an embodiment of the present invention, the Data Integrity Field Engine (DIF engine) 255 may generate 8-byte DIF protection data containing a 4-byte reference tag, a 2-byte application tag, and a 2-byte cyclic redundancy code (CRC) on data of each 512-byte data block. The reference tag may be (but is not limited to), for example, the last 4 bytes of the data access address of each 512-byte data block. The application tag may be a value defined by the user. The CRC may be a fault detection code generated after executing an algorithm on each 512-byte data. The DIF data may improve the correctness of data during a transmission/receiving process in order to detect wrong data earlier and avoid use of the wrong data and to improve the correctness of system operations. According to an embodiment of the present invention, the DIF engine 255 may include a generation mode and a validation mode. The generation mode may generate a DIF data for each 512-byte data block, and the validation mode may verify the correctness of each user data from the received data having DIF data.

According to an embodiment of the present invention, the TCP engine (Transmission Control Protocol Engine) 256 is used to move the data in the memory 280 and simultaneously compute a checksum from the moved data according to some algorithm for verifying the correctness of the moved data. When the embedded CPU 242 or the external CPU 243 intends to move data from one region of the memory to another region of the memory or to another memory, first the CPU establishes a scatter-gather list and initializes the TCP engine 256 to execute steps for data movement in the memory 280. The scatter-gather list is provided for recording the beginning address, the destination address, and the data length of data intended to be moved in the memory. The TCP engine 256 may assist the embedded CPU 242 or the external CPU 243 in moving a large amount of data in some region of the memory 280 in order to reduce the workload of the embedded CPU 242 or the external CPU 243 to process the data movement so as to increase the performance of system operation. If the checksum calculating function of the TCP engine 256 is turned off, the TCP engine 256 may be used as a direct memory access (DMA) engine.

According to an embodiment of the present invention, the RAID 6 engine 257 may generate parity data P1, P2, ..., Pn (wherein n is an integer, and n>=2) by different algorithms in each data stripe containing the user data and the parity data. In the same data stripe, if the number of lost data chunks is not greater than n, the lost user data may be regenerated from the user data and the parity data which are in the same stripe and not lost with the related algorithms. Because the parity data may contain a plurality of parity data, the data rebuilding ability of the system is better than the system only containing one parity data, and therefore, such a RAID system having a plurality of parity data has a better fault tolerance ability than those having one parity data. The RAID 6 engine 257 may also execute the computation of one parity data only, e.g., RAID 3 or RAID 5. According to another embodiment of the present invention, the RAID 6 engine 257 may be replaced by another RAID engine with a different RAID level.

According to an embodiment of the present invention, the PCI-Express interface controllers 258 may be the IO interface controller for connecting to the host-side I/O device interconnect controller 220, and may be used as an IO interface between the IO processor 224 and the host 10. According to another embodiment of the present invention, the IO processor 224 may contain a plurality of the PCI-Express interface controllers 258, and is not necessarily limited to a single PCI-Express interface controller 258.

According to an embodiment of the present invention, the PCI-Express interface controllers 259 may be the IO interface controller for connecting to the device-side I/O device interconnect controller 300, and may be used as an IO interface between the IO processor 224 and the PSDs. According to another embodiment of the present invention, the IO processor 224 may contain a plurality of the PCI-Express interface controllers 259, and is not limited to a single PCI-Express interface controller 259.

According to another embodiment of the present invention, the PCI-Express interface controllers 258, 259 may also be the IO interface controller of PCI or PCI-X protocol, or other communication protocols.

Please refer to FIG. 4. According to an embodiment of the present invention, the first arbiter 261 may be a bi-directional interface for data transmission from multiple master units to a single slave units, wherein the master units may be the DIF engine 255, the TCP engine 256, the RAID 6 engine 257, 2 PCI-Express interface controllers 258 and 259, and the first bridge 264, etc., and the slave unit may be the first memory controller 270. The first arbiter 261 may be for determining which master unit may obtain the access control over the slave unit. For example, after obtaining the access control of the first memory controller 270 from the first arbiter 261, the DIF engine 255 may access the first memory 2801 through the first memory controller 270. The working frequency of the first arbiter 261 may be 333 MHz, the width of data bus may be 128 data transmission lines and 128 data receiving lines. Please note that the aforementioned specification of the first arbiter 261 is an example for illustrative purposes only, and is not meant to limit the present invention.

According to an embodiment of the present invention, the address remapping device 262 may be used as an address translation interface for a memory address. When there are two memory modules with the same storage space in the system, for example 512 MB and 512 MB, respectively, CPU may recognize one of the storage space of 0 through 512 MB-1, while another storage space of 0 through 512 MB-1 has to be translated into other memory addresses by the address remapping interface for the CPU to read. According to an embodiment of the present invention, the second memory 2802 may be 256 MB. When both the first memory 2801 and the second memory 2802 are in use, if the embedded CPU 242 and the external CPU 243 intends to access data of the addresses from 0 to 256 MB-1 in the first memory 2801, due to both the first memory 2801 and the second memory 2802 having the same addresses from 0 to 256 MB-1, according to the design, the embedded CPU 242 and the external CPU 243 may only recognize and access the data of addresses from 0 to 256 MB-1 in the second memory 2802, whereas data of addresses from 0 to 256 MB-1 in the first memory 2801 need to be translated into other addresses for access, otherwise it can not be accessed. Therefore, through function of the address translation offered by the address remapping device 262, the addresses from 0 to 256-1 MB in the first memory 2801 are translated into other addresses, and then the embedded CPU 242 and the external CPU 243 may access the data in the addresses from 0 to 256-1 MB in the first memory 2801 correctly. According to another embodiment of the present invention, when there is only one memory used in the system, the address remapping device 262 may also be used for address translation. For example, if storage space of the single memory is greater than 4 GB, the storage space of the single memory module may exceed the addressing ability of the CPU, and the address remapping device 262 may be used for translating addresses over 4 GB such that the addresses over 4 GB can be addressed. According to another embodiment of the present invention, the address remapping device 262 may be used for address translation for other purposes. Please note that the above-mentioned addresses of the first memory 2801 and the second memory 2802 are examples for illustrative purposes only, and are not meant to be limitations of the present invention.

According to an embodiment of the present invention, the second arbiter 263 may be a bidirectional interface for data transmission from multiple master units to multiple slave units., wherein the master units may be the external CPU 243, the embedded CPU 242, and the USB controller 245, and the two slave units may be the second bridge 265 and the second memory controller 275. The second arbiter 263 may be for determining which master unit may obtain the access control over the slave unit. For example, after obtaining the access control of the second memory controller 275 from the second arbiter 263, the embedded CPU 242 may access the second memory 2802 through the second memory controller 275. The working frequency of the second arbiter 263 may be 166 MHz, the width of data bus may be 128 data transmission lines and 128 data receiving lines. Please note that the aforementioned specification of the second arbiter 263 is an example for illustrative purposes only, and is not meant to be a limitation of the present invention.

According to an embodiment of the present invention, the first bridge 264 is used as a data conversion interface between the first arbiter 261 and the second arbiter 263. When the external CPU 243, the embedded CPU 242, or the USB controller 245 intends to transmit data or control signals to the first memory controller 270 through the second arbiter 263, because the working frequencies and the protocols of these two arbiters 261 and 263 are different, data in each arbiter cannot be used by the other part directly. Therefore, the data should be converted by the first bridge 264 and can then be used by the other part.

According to an embodiment of the present invention, the second bridge 265 may be used as a data conversion interface between the circuitry units, such as the second arbiter 263 and the I2C controller 292, the GPIO controller 293, and the UART controller 294, etc. When the external CPU 243, the embedded CPU 242, or the USB controller 245 intends to transmit data or control signals to the I2C controller 292, the GPIO controller 293, or the UART controller 294, or the I2C controller 292, the GPIO controller 293, or the UART controller 294 intend to transmit data or control signals to the external CPU 243, the embedded CPU 242, or the USB controller 245 through the second arbiter 263, because the working frequencies and/or the communication protocols of the second arbiter 263, the I2C controller 292, the GPIO controller 293, and the UART controller 294 may be different, data in each part cannot be used directly by the opposite part. Therefore, the second bridge 265 may be used as a data conversion interface to convert the data into a format suitable for use by the opposite part.

According to an embodiment of the present invention, the first memory controller 270 may be a memory controller capable of supporting an error-correcting code (ECC) function and applying in a Double Data Rate 1 (DDR1) mode or a Double Data Rate 2 (DDR2) mode. The width of data bus of the first memory controller 270 may be 64 bits. The first memory controller 270 is capable of receiving the read or write requests from the CPU or other peripheral circuitry units for accessing data stored in the first memory module 2801. The circuitry units transmitting data through the second arbiter 263, e.g., the external CPU 243 and the embedded CPU 242, and the circuitry units transmitting data through the first arbiter 261, e.g., the DIF engine 255, the TCP engine 256, and the RAID 6 engine 257, may both access the data stored in the first memory module 2801 through the first memory controller 270. Please note that the aforementioned specification of the first memory controller 270 is an example for illustrative purposes only, and is not meant to be a limitation of the present invention.

According to an embodiment of the present invention, the second memory controller 275 may be a memory controller capable of supporting the ECC function and applying in the DDR1 mode or the DDR2 mode. The width of data bus of the second memory controller 275 can be 32 bits. The second memory controller 275 is capable of receiving the read or write requests from the CPU for accessing the data stored in the second memory module 2802. The external CPU 243 and the embedded CPU 242 both may access data stored in the second memory module 2802 through the second memory controller 275. However, the circuitry units transmitting data through the first arbiter 261, e.g., the DIF engine 255, the RAID 6 engine 257, and the TCP engine 256, may not access the data stored in the second memory module 2802 through the second memory controller 275. In other words, the second memory module 2802 may be used dedicatedly for the embedded CPU 242 and the external CPU 243 in order to improve the system performance. According to another embodiment of the present invention, the circuitry units transmitting data through the first arbiter 261, e.g., the DIF engine 255, the RAID 6 engine 257, and the TCP engine 256, may all access the data stored in the second memory 2802 through the second memory controller 275. Please note that the aforementioned specification of the second memory controller 275 is an example for illustrative purposes only, and is not meant to be a limitation of the present invention.

According to an embodiment of the present invention, the first memory module 2801 may be a DDR1 memory module or a DDR2 memory module supporting the ECC function, and accessed by the external CPU 243, the embedded CPU 242, and the circuitry units transmitting data through the first arbiter 261, e.g., the DIF engine 255, the RAID 6 engine 257, and the TCP engine 256. The first memory module 2801 may be primarily used for storing temporary data. According to another embodiment of the present invention, the first memory module 2801 may be not only used for storing temporary data, but also used for storing the instructions of the external CPU 243 or the embedded CPU 242. Because usually a large amount of the data is stored in the first memory module 2801, the storage space in the first memory module 2801 will be larger than that in the second memory module 2802 in practical implementation. According to another embodiment of the present invention, the first memory module 2801 may be DDR1 memory module or DDR2 memory module without supporting the ECC function.

According to an embodiment of the present invention, the second memory module 2802 may be a DDR1 memory module or a DDR2 memory module supporting the ECC function, and may be provided for accessing data only by the external CPU 243 and the embedded CPU 242. Because the second memory module 2802 is mainly used for storing temporary data and the instructions of the external CPU 243 and the embedded CPU 242, the storage space in the second memory module 2802 is often less than that in the first memory module 2801 in implementation. The second memory module 2802 in the SVC 200 may be an on-board memory module or an attachable memory module. According to another embodiment of the present invention, the second memory module 2802 may be omitted if the second memory module 2802 is unnecessary. According to still another embodiment of the present invention, the second memory module 2802 may be the DDR1 memory module or the DDR2 memory module without supporting the ECC function.

According to an embodiment of the present invention, the I2C controller 292 is an inter-integrated circuit bus controller, which is a low-cost interconnect and capable of supporting bidirectional data transmission at an acceptable data transfer rate, typically used in a PC to facilitate the CPU in controlling and monitoring the statuses of the mother board and other devices, such as temperature, fan speeds, etc. The I2C controller 292 can be used as a controller for a I2C interconnect between the SVC 200 and the EMS 360.

According to an embodiment of the present invention, the GPIO controller 293 is a general purpose input/output controller. The GPIO controller 293 can be used as a controller for controlling an IO Input (single direction), an IO Output (single direction), or an IO Input and Output (bidirectional), depending on the requirements of the software. The GPIO controller 293 is a low-speed device controller, and the input/output of the GPIO controller 293 may be controlled by software.

According to an embodiment of the present invention, the Universal Asynchronous Receiver/Transmitter (UART) controller 294 is a peripheral IO control circuitry unit capable of converting serial signals to parallel signals from the peripheral devices or a modem, or converting parallel signals of CPU to serial signals.

According to an embodiment of the present invention, the IO processor 224 in FIG. 4 are connected to the external CPU 243, the first memory module 2801, and the second memory module 2802. In such a configuration, the IO processor 224 may help the system to achieve the highest performance.

In FIG. 4, due to existence of the external CPU 243, the external CPU 243 and the embedded CPU 242 may share the workload together. According to an embodiment of the present invention, the external CPU 243 may be set as the primary CPU, and the embedded CPU 242 be set as the slave CPU. The external CPU 243 receives IO requests from many hosts, and assigns the tasks needing repeated computations and/or part of the IO processing tasks to the embedded CPU 242 for execution according to the settings of the software and firmware, and waits for the reply with the executed results from the embedded CPU 242. While the embedded CPU 242 executes the tasks assigned by the external CPU 243, the external CPU 243 may continue processing other tasks or receiving other requests from the hosts. Due to the sharing of the workload by the external CPU 243 and the embedded CPU 242, the system may achieve a better performance. For example, if the external CPU 243 receives a request for data encryption from software, computations using complicated algorithms may be required in the data encryption process, resulting in occupation of most resources of the external CPU 243. In such a situation, the external CPU 243 may assign the task of data encryption to the embedded CPU 242. The external CPU 243 may simply inform the embedded CPU 242 of information related to data encryption task and to the embedded CPU 242 will then perform the computations of the data encryption according to the algorithms. As a result, the external CPU 243 need only wait for the reply with the executed results from the embedded CPU 242, and may simultaneously continue processing other tasks or receiving requests from the hosts. After finishing the computations of the data encryption, the embedded CPU 242 may pass to the external CPU 243 a task completed message and related information, such as the location where the encrypted data is stored, and wait for another task assigned by the external CPU 243. According to an embodiment of the present invention, the external CPU 243 and the embedded CPU 242 may be set as processing the requests from the hosts in parallel, and an operating system may be responsible for assigning the work to both CPUs.

Figure 5:
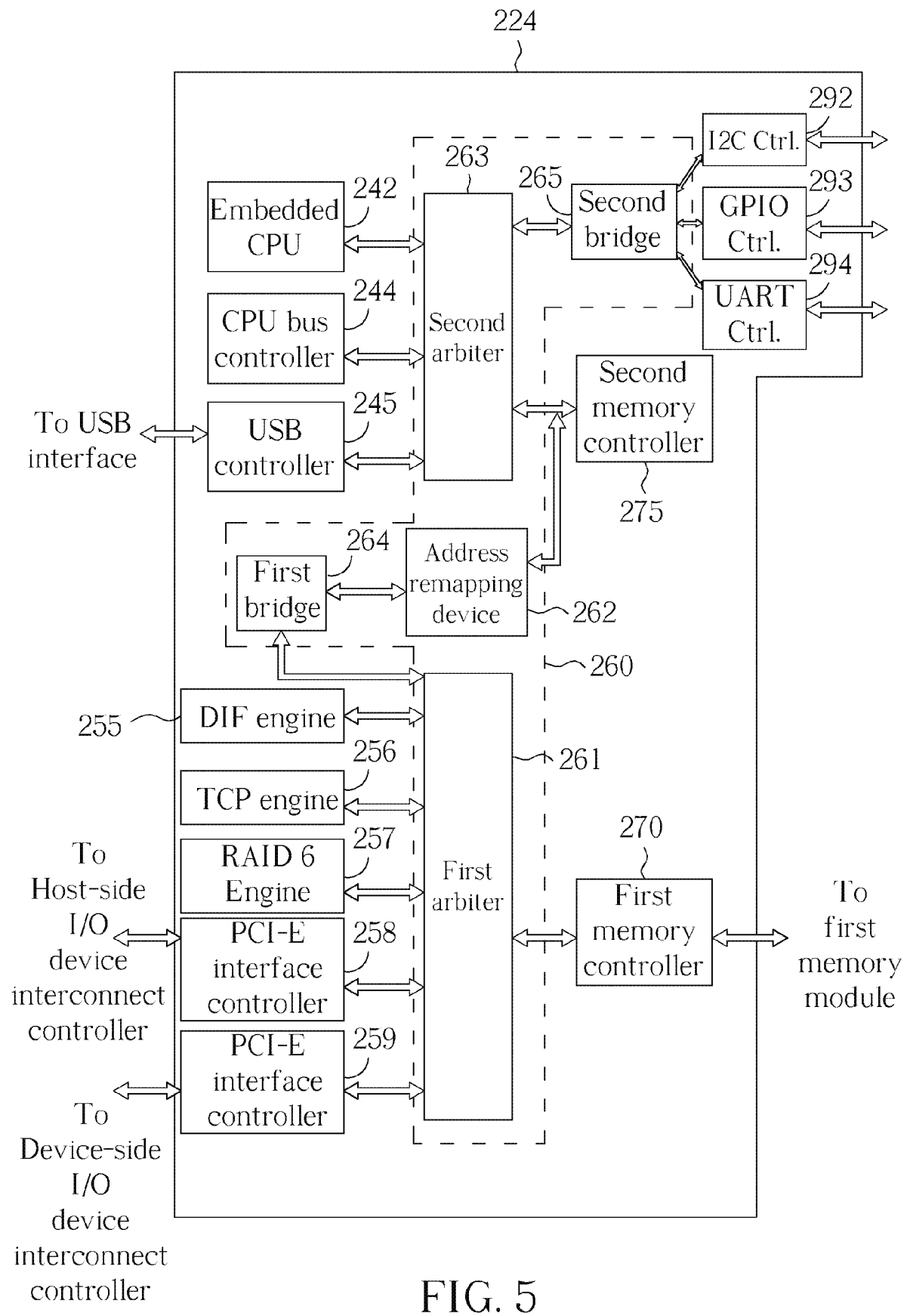
FIG. 5 is a block diagram of another configuration alternative of the embodiment in FIG. 4 in connection with other circuitry units.

Usually, the external CPU 243 has a higher computing power than the embedded CPU 242. However, the external CPU 243 may be allocated with different ranks flexibly according to the needs of the system performance in practice. If the system workload is low, the external CPU 243 may even be omitted in the system to meet a low cost requirement. As shown in FIG. 5, when the external CPU 243 is omitted, the embedded CPU 242 should process all the requests from the hosts and other computations alone.

Please refer to FIG. 4. There are two memory modules, i.e., the first memory module 2801 and the second memory module 2802, in FIG. 4, therefore the system performance may be increased. The first memory module 2801 and the second memory module 2802 may be either an onboard memory module or an attachable memory module. In addition, the second memory module 2802 may be set as a dedicated memory module for storing the data and instructions of the CPUs, and the first memory module 2801 may be set as a general memory module for storing the data and instructions of the CPUs' and other temporary data, for access by the external CPU 243, the embedded CPU 242, and other peripheral interface circuitry units, such as the I2C controller, the UART controller, and the GPIO controller. In practical implementation, accessing these two memory modules in this way may prevent system performance decrease due to common use of the second memory module 2802 by the external CPU 243, the embedded CPU 242, and other circuitry units, such as the DIF engine 255, the TCP engine 256, and the RAID 6 engine 257. The reason why the system performance decrease may be prevented is explained in more detail as follows. When the embedded CPU 242 or the external CPU 243 intends to access instructions or data CPU, because the second memory module 2802 is a dedicated memory module for storing instructions and data of the CPU, and thus only embedded CPU 242 and the external CPU 243 can access the second memory module 2802. The situation that the embedded CPU 242 or the external CPU 243 cannot access the second memory module 2802 until the completion of data access of the peripheral interface circuitry units will not occur. On the contrary, if the second memory module 2802 is set as a general memory module, and if the second memory module 2802 happens to be accessed by other circuitry units when the external CPU 243 or the embedded CPU 242 intends to access it, the external CPU 243 or the embedded CPU 242 can not start their access until the end of the access by the other circuitry units, hence the system performance will be lessened. Moreover, if the first memory module 2801 is set as the dedicated memory for storing the data and instructions of the CPUs, and the second memory module 2802 is set as a general memory module for storing the CPU data and instructions, and the data and instructions that are not the CPU data and instructions, then when the external CPU 243 or the embedded CPU 242 intends to access the data and instructions stored in the first memory module 2801, it has to pass through circuitry units such as the second arbiter 263, the address remapping device 262, the first bridge 264, the first arbiter 261, and the first memory controller 270; meaning that the data transmission path is relatively long. In contrast, if the data and instructions of the CPUs are stored in the second memory module 2802, when the external CPU 243 or the embedded CPU 242 intends to access the second memory module 2802, they only have to pass through the second arbiter 263 and the second memory controller 275, but not passing through the address remapping device 262, the first bridge 264, and the first arbiter 261, meaning that the data transmission path is relatively short, and the access time of the CPUs to the data and instructions is relatively decreased. In addition, if the data and instructions of the CPUs are stored in the first memory module 2801, the same problem may arise wherein the system performance decreases due to the common use of the first memory module 2801 by the external CPU 243, the embedded CPU 242, and other circuitry units, such as the DIF engine 255, the TCP engine 256, and the RAID 6 engine 257. According to the above, the arrangement of the second memory module 2802 as a dedicated memory for storing the data and instructions of the CPUs, and the first memory 2801 as a general memory capable of storing the CPU data and instructions, and data and instructions that are not the CPU data and instructions (as shown in FIG. 4) improves the system efficiency.

Compared with the system with only one embedded CPU 242 in the IO processor 224, the IO processor 224 in the present embodiment of the present invention is connected with an external CPU 243 in addition to the embedded CPU 242, and thus the system performance is better. In addition, if the performance of the external CPU 243 is better than that of the embedded CPU 242, in order to achieve the best performance of the system, one CPU may be set as the primary CPU and the other as a slave CPU for processing the IO requests from the hosts and the internal operations respectively, or both the CPUs 242, 243 may be set to process work in parallel, depending on the practical needs.

FIG. 5 is a diagram of another configuration of the embodiment in FIG. 4 wherein the IO processor 224 is only connected with the first memory module 2801, and both the external CPU 243 and the second memory module 2802 are omitted. In this embodiment, the connection between the IO processor 224 and the other circuitry units will put the system performance in a lower state, but the cost of constructing the system is the lowest. Therefore, for a system with lower workload but higher cost concerns, such a system provides an alternative fulfilling both the practical requirements and the cost concern.

More configurations of the SVC 200 which may fulfill different practical requirements and cost concerns are describe below according the embodiments of the present invention. (1) The external CPU 243 and the first memory module 2801 are provided in the SVC 200, and the second memory module 2802 is omitted. (2) The external CPU 243 is omitted in the SVC 200, and the external CPU 243 and the second memory module 2802 are provided. (3) When the external CPU 243 is provided in the SVC 200, the rank of the external CPU 243 can be raised or lowered, depending on practical application requirements. In conclusion, the connection of the external CPU 243 and second memory module 2802 to the IO processor 224 can be changed flexibly to meet the practical application requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An IO processor utilized in a storage virtualization system comprising:
   an embedded CPU;
   a switch coupled to the embedded CPU, wherein the switch comprises:
      a first arbiter;
      a second arbiter; and
      a first bridge coupled between the first arbiter and the second arbiter;
   an external CPU bus controller coupled to the switch for optionally coupling to an external CPU;
   a first memory controller coupled to the switch for coupling to a first memory; and
   a second memory controller coupled to the switch for optionally coupling to a second memory;
   wherein the embedded CPU, the external CPU bus controller, and the second memory controller are coupled to the second arbiter, and the first memory controller is coupled to the first arbiter.

2. The IO processor of claim 1, wherein the first arbiter is operated based on a first bus protocol, and the second arbiter is operated based on a second bus protocol.

3. The IO processor of claim 2 further comprising an address remapping device coupled between the first arbiter and the second arbiter, and coupled to the first bridge.

4. The IO processor of claim 1 further comprising a RAID 6 engine for generating parity data.

5. The IO processor of claim 1 further comprising a DIF engine for generating or verifying data correctness with DIF data.

6. The IO processor of claim 1 further comprising an IO interface controller for coupling to an IO interconnect controller.

7. The IO processor of claim 1 further comprising a USB controller for processing USB signals transmitted to the IO processor.

8. The IO processor of claim 1 further comprising a TCP engine for moving data in a memory.

9. The IO processor of claim 1, wherein the IO processor is coupled to an external CPU, one of the external CPU and the embedded CPU is used as a primary CPU for a storage virtualization controller in the storage virtualization system, the other of the external CPU and the embedded CPU is used as a slave CPU for the storage virtualization controller, and the primary CPU assigns requests issued from a host entity to the slave CPU for execution.

10. The IO processor of claim 1, wherein the second memory controller is coupled to the second memory, and the second memory is used dedicatedly for storing data and instructions of the embedded CPU or of the external CPU.

11. The IO processor of claim 1, wherein the second memory controller is coupled to the second memory, and IO data that are not data or instructions of the embedded CPU or of the external CPU are stored in the first memory.

12. A storage virtualization controller comprising:
   an IO processor;
   at least one first memory;
   at least one IO device interconnect controller for coupling to the IO processor;
   a host-side port provided in the at least one IO device interconnect controller for coupling to a host;
   a device-side port provided in the at least one IO device interconnect controller for coupling to at least one physical storage device (PSD); and
   the IO processor comprising:
      an embedded CPU;
      a switch coupled to the embedded CPU; wherein the switch comprises:
         a first arbiter;
         a second arbiter; and
         a first bridge coupled between the first arbiter and the second arbiter;
      an external CPU bus controller coupled to the switch for optionally coupling to an external CPU;
      a first memory controller coupled to the switch for coupling to a first memory; and
      a second memory controller coupled to the switch for optionally coupling to a second memory;
      wherein the embedded CPU, the external CPU bus controller, and the second memory controller are coupled to the second arbiter, and the first memory controller is coupled to the first arbiter.

13. The storage virtualization controller of claim 12, wherein the first arbiter is operated based on a first bus protocol, and the second arbiter is operated based on a second bus protocol.

14. The storage virtualization controller of claim 13 further comprising an address remapping device coupled between the first arbiter and the second arbiter, and coupled to the first bridge.

15. The storage virtualization controller of claim 12 further comprising a RAID 6 engine for generating parity data.

16. The storage virtualization controller of claim 12 further comprising a DIF engine for generating or verifying data correctness with DIF data.

17. The storage virtualization controller of claim 12 further comprising a USB controller for processing USB signals transmitted to the IO processor.

18. The storage virtualization controller of claim 12 further comprising a TCP engine for moving data in a memory.

19. The storage virtualization controller of claim 12 wherein the IO processor is coupled to an external CPU, one of the external CPU and the embedded CPU is used as a primary CPU for the storage virtualization controller, the other of the external CPU and the embedded CPU is used as a slave CPU for the storage virtualization controller, and the primary CPU assigns requests issued from a host entity to the slave CPU for execution.

20. The storage virtualization controller of claim 12, wherein the second memory controller is coupled to the second memory, and the second memory is dedicatedly for storing data and instructions of the embedded CPU or of the external CPU.

21. The storage virtualization controller of claim 12, wherein the second memory controller is coupled to the second memory, and IO data that are not CPU data or CPU instructions are stored in the first memory.

22. A storage virtualization subsystem comprising:
a disk array comprising a plurality of physical storage devices for providing storage space; and
a storage virtualization controller coupled to the disk array for receiving IO requests accessing the disk array from a host, the storage virtualization controller comprising:
an IO processor;
at least one first memory;
at least one IO device interconnect controller coupled to the IO device processor;
a host-side port provided in the at least one IO device interconnect controller for connecting to the host;
a device-side port provided in the at least one IO device interconnect controller for connecting to the disk array; and
the IO processor comprising:
an embedded CPU;
a switch coupled to the embedded CPU, wherein the switch comprises:
a first arbiter;
a second arbiter; and
a first bridge coupled between the first arbiter and the second arbiter;
an external CPU bus controller coupled to the switch for optionally coupling to an external CPU;
a first memory controller coupled to the switch for coupling to a first memory; and
a second memory controller coupled to the switch for optionally coupling to a second memory;
wherein the embedded CPU, the external CPU bus controller, and the second memory controller are coupled to the second arbiter, and the first memory controller is coupled to the first arbiter.

23. The storage virtualization subsystem of claim 22, wherein the first arbiter is operated based on a first bus protocol, and the second arbiter is operated based on a second bus protocol.

24. The storage virtualization subsystem of claim 23 further comprising an address remapping device coupled between the first arbiter and the second arbiter, and coupled to the first bridge.

25. The storage virtualization subsystem of claim 22 further comprising a RAID 6 engine for generating parity data.

26. The storage virtualization subsystem of claim 22 further comprising a DIF engine for generating or verifying data correctness with DIF data.

27. The storage virtualization subsystem of claim 22 further comprising a USB controller for processing USB signals transmitted to the IO processor.

28. The storage virtualization subsystem of claim 22 further comprising a TCP engine for moving data in a memory.

29. The storage virtualization subsystem of claim 22, wherein the IO processor is coupled to an external CPU, one of the external CPU and the embedded CPU is used as a primary CPU for the storage virtualization controller, the other of the external CPU and the embedded CPU is used as a slave CPU for the storage virtualization controller, and the primary CPU assigns requests issued from a host entity to the slave CPU for execution.

30. The storage virtualization subsystem of claim 22, wherein the second memory controller is coupled to the second memory, and the second memory is dedicatedly for storing data and instructions of the embedded CPU or of the external CPU.

31. The storage virtualization subsystem of claim 22, wherein the second memory controller is coupled to the second memory, and IO data that are not CPU data or CPU instructions are stored in the first memory.

32. A method of performing data processing in an IO processor having a switch, an embedded CPU, an external CPU bus controller, an IO processing device other than the embedded CPU, a first memory controller, and a second memory controller, the method comprising:
providing a first memory coupled to a first memory controller;
providing a second memory coupled to a second memory controller;
providing CPU data into the second memory;
providing a CPU instruction into the second memory;
the embedded CPU accessing CPU data and CPU instructions stored in the second memory through the switch and the second memory controller;
the IO processing device other than the embedded CPU processing a first IO data;
buffering the first IO data in the first memory through the switch; and
providing a first arbiter, a second arbiter, and a first bridge in the switch, said first bridge being coupled between the first arbiter and the second arbiter, wherein the embedded CPU, the external CPU bus controller, and the second memory controller are coupled to the second arbiter, and the first memory controller is coupled to the first arbiter.

33. The method of claim 32, wherein the IO processing device other than the embedded CPU comprises an IO interface controller for coupling to an IO interconnect controller.

34. The method of claim 32, wherein the IO processor is used in a storage virtualization controller.

35. The method of claim 32 further comprising:
providing an external CPU to couple with the external CPU bus controller; and
the external CPU accessing the CPU data and CPU instructions stored in the second memory through the switch and the second memory controller.

36. The method of claim 32, wherein the first arbiter is operated based on a first bus protocol, and the second arbiter is operated based on a second bus protocol.

37. The method of claim 36 further comprising:
providing an address remapping device coupled between the first arbiter and the second arbiter, and coupled to the first bridge.

38. The method of claim 32 further comprising:
providing a RAID 6 engine coupled to the switch for generating parity data.

39. The method of claim 32 further comprising:
providing a DIF engine coupled to the switch for generating or verifying data correctness with DIF data.

40. The method of claim 32 further comprising:
providing a USB controller coupled to the switch for processing USB signals transmitted to the IO processor.

41. The method of claim 32 further comprising:
providing a TCP engine coupled to the switch for moving data in a memory.

42. The method of claim 32 further comprising:
providing an external CPU coupled to the external CPU bus controller to share workload of the embedded CPU.

\* \* \* \* \*